United States Patent [19]
Iwasaki et al.

[11] Patent Number: 5,478,623
[45] Date of Patent: Dec. 26, 1995

[54] OPTICAL RECORDING MEDIUM AND METHOD OF MANUFACTURING THE SAME

[75] Inventors: Shingo Iwasaki; Taishi Tsuji; Takashi Chuman; Satoru Tanaka; Shuichi Yanagisawa; Fumio Matsui, all of Tsurugashima, Japan

[73] Assignee: Pioneer Electronic Corporation, Tokyo, Japan

[21] Appl. No.: 336,669

[22] Filed: Nov. 7, 1994

[30] Foreign Application Priority Data

Nov. 15, 1993 [JP] Japan .................................... 5-285348

[51] Int. Cl.⁶ ................................ B32B 3/00; G11B 7/24
[52] U.S. Cl. ........................ 428/64.8; 428/216; 428/333; 428/336; 428/457; 428/913; 430/270.16; 430/495; 430/945

[58] Field of Search ................................ 428/64, 65, 215, 428/216, 332, 333, 336, 457, 913; 430/270, 495, 945

[56] References Cited

U.S. PATENT DOCUMENTS 5,407,719  4/1995  Hamada et al. ............................ 428/64

Primary Examiner—B. Hamilton Hess
Attorney, Agent, or Firm—Nixon & Vanderhye

[57] ABSTRACT

An optical recording medium is provided with: a light transmissive substrate; a recording film formed of an organic dye with 2,2,3,3-tetrafluoro-1-propanol having pH of not less than 6.0 as a solvent, on a surface of the substrate; a reflective film formed on a surface of the recording film; and a protection film formed on a surface of the reflective film.

5 Claims, 4 Drawing Sheets

PASSAGE OF TIME (H)

5,478,623

OPTICAL RECORDING MEDIUM AND METHOD OF MANUFACTURING THE SAME

BACKGROUND OF THE INVENTION

1. Field of the Invention

The present invention relates to an optical recording medium excellent in a humidity resistance and a method of manufacturing the same, and in particular, to an optical recording medium having a recording film including an organic dye and a method of manufacturing the same.

2. Description of the Related Art

An organic dye such as a cyanine dye or a phthalocyanine dye is used as composition of a recording film of a so-called WORM (Write Once Read Multiple) type optical recording medium.

Writing in the WORM type optical recording medium is performed by irradiating and collecting a laser beam onto a fine section of the recording film, and then transforming the laser beam into thermal energy to change the recording film in its condition (i.e. forming pits on the surface of the recording film). In order to smoothly change the recording film in its condition, two sets of substrates, on each of which a recording film is formed, are prepared and arranged in such a manner that the recording films thereof face each other, like a so-called air sandwitching structure.

The laser beam used for writing in the above-mentioned WORM type optical recording medium is irradiated in the direction from the side of the substrate so as to form pits optically readable in the recording film. The output of the laser beam used for reading to reproduce the recorded data is weaker than that used for writing, and the contrast between the portion provided with the pit and the portion without the pit can be read as an electric signal.

In addition, there is another type of a so-called ROM (Read Only Memory) type optical recording medium in which data was recorded in advance, which is different from the above-mentioned WORM type optical recording medium and which is used in the fields of the voice recording and the information processing. The above-mentioned ROM type medium does not have a writable recording film. More specifically, in the ROM type medium, pre-pits which correspond to the data to be reproduced are formed on the substrate made of plastics by an injection molding, then a reflecting film made of metal such as Au, Ag, Cu, Al and the like are formed thereon, and then a protection film is further formed thereon. The Compact Disk which is a so-called CD is the typical medium of the ROM type medium. The specification of the signal for recording and reading the CD is standardized, and the reproducing apparatus of the CD based on this standard is used as a Compact Disk player (CD player).

The above-mentioned WORM type optical recording medium as well as the CD uses a laser beam. A configuration of the WORM type optical recording medium as well as the CD is a disk type. Accordingly, there may be developed a WORM type optical recording medium which satisfies the standard of the CD specification and can be used in the CD player without any additional equipment.

More specifically, various studies are made on the WORM type optical recording medium including a light transmissive substrate, a recording film including an organic dye formed on the substrate, a reflective film formed on the recording film and a protecting film formed on the reflective film.

As a solvent for dye material forming the recording film of the WORM type optical recording medium, for example, diacetone alcohol, 2-ethoxyethanol, 2-methoxyethanol, isophorone, methanol, 2,2,3,3-tetrafluoro-1-propanol and the like are appropriately selected and used.

Since the signals of the above-mentioned optical recording medium is reproduced in the CD player mounted on the vehicle, it is required to be excellent in a environmental resistance.

However, the above-mentioned WORM type optical recording medium is rather poor in this environmental resistance.

SUMMARY OF THE INVENTION

It is therefore an object of the present invention is to provide an optical recording medium which is excellent in a humidity resistance, i.e., has a small deterioration appearance by means of humidity, and the method of efficiently manufacturing the same.

In accordance with the present invention, there is provided an optical recording medium which is provided with:

a light transmissive substrate;

a recording film formed of an organic dye by use of 2,2,3,3-tetrafluoro-1-propanol having pH of not less than 6.0 as a solvent, on a surface of said substrate;

a reflective film formed on a surface of said recording film; and a protection film formed on a surface of said reflective film.

In accordance with the present invention, there is further provided a method of manufacturing an optical recording medium which has the steps of:

preparing a light transmissive substrate;

coating an organic dye solution with 2,2,3,3-tetrafluoro-1-propanol having pH of not less than 6.0 as a solvent on a surface of said substrate to form a recording film;

forming a reflective film on a surface of said recording film; and forming a protection film on a surface of said reflective film.

Intensive studies have been made to reach the following findings as for the environmental resistance of the optical recording medium. Namely, the optical recording medium having a recording film formed by use of the dye solution with a specific solvent is excellent especially in a humidity resistance, thus stably functioning at high efficiency.

The present invention is made on the basis of the above-mentioned findings and the above described optical recording medium of the present invention is constructed to have an excellent humidity resistance.

Further objects, features and other aspects of this invention will be understood from the following detailed description of the preferred embodiments of this invention with reference to the drawings.

DETAILED DESCRIPTION OF THE PREFERRED EMBODIMENTS

An optical recording medium of the present invention and a method of manufacturing the same will now be described with reference to the accompanying drawings.

Figure 1:
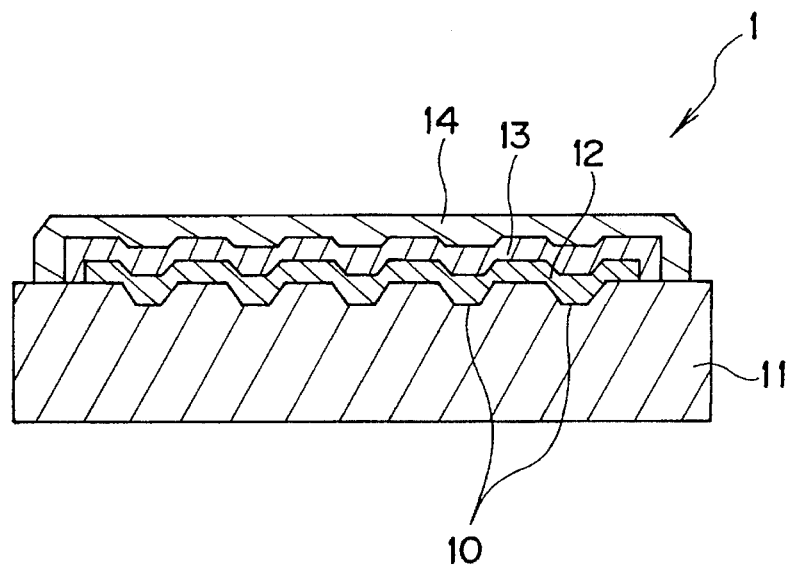
FIG. 1 is a partial enlarged sectional view illustrating one of the embodiment of an optical recording medium of the present invention.
Figure 2:
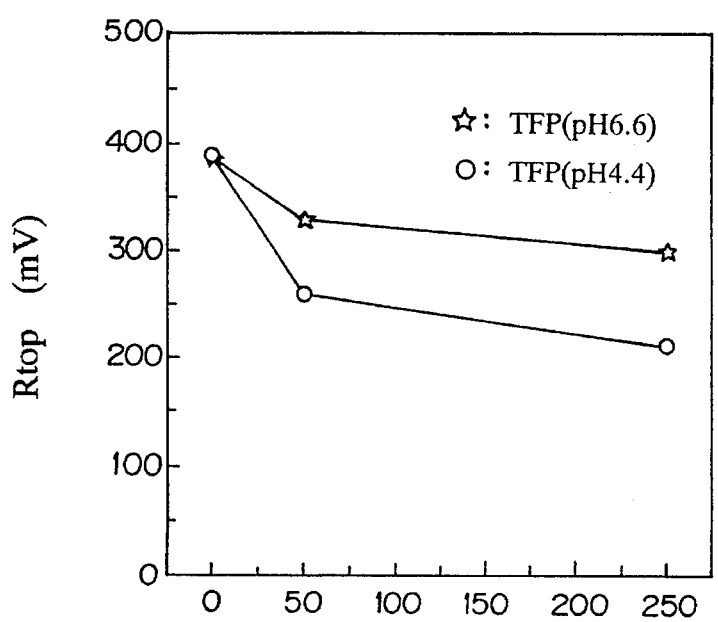
FIG. 2 is a graph showing a relationship between Rtop signal and a passed time in the Example 1.
Figure 3:
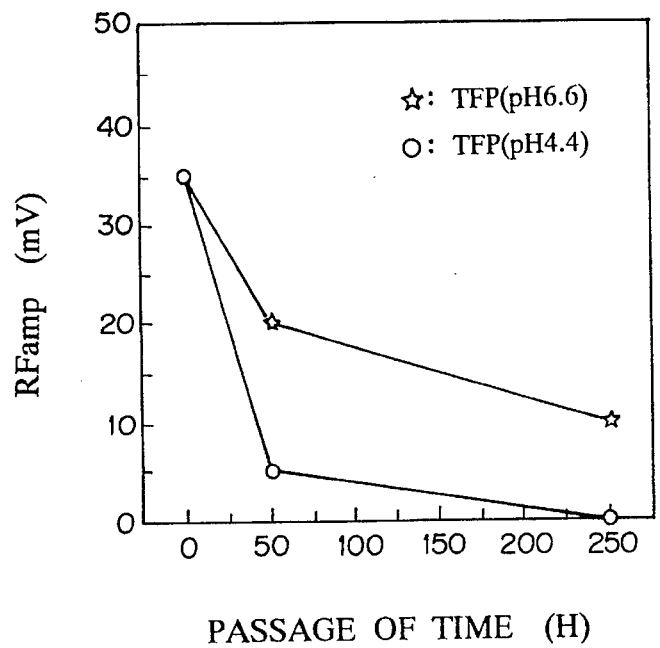
FIG. 3 is a graph showing a relationship between Ramp signal and a passed time in the Example 1.
Figure 4:
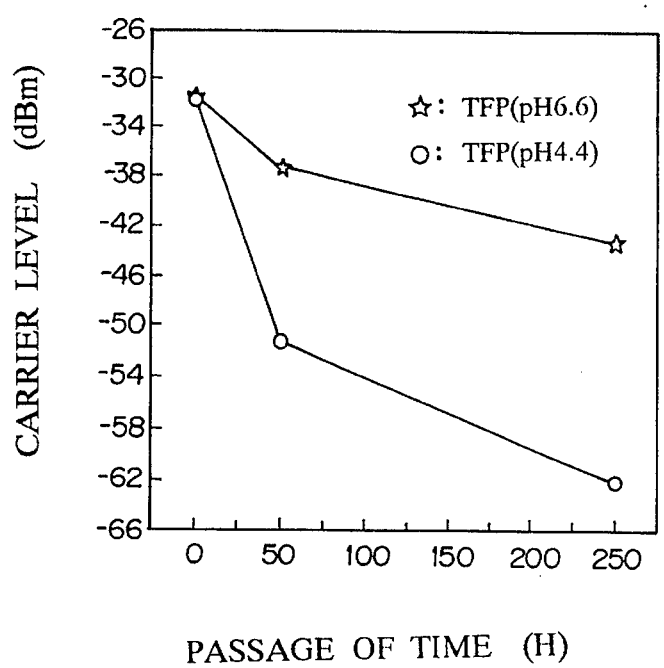
FIG. 4 is a graph showing a relationship between a Carrier Level and a passed time in the Example 1.
Figure 5:
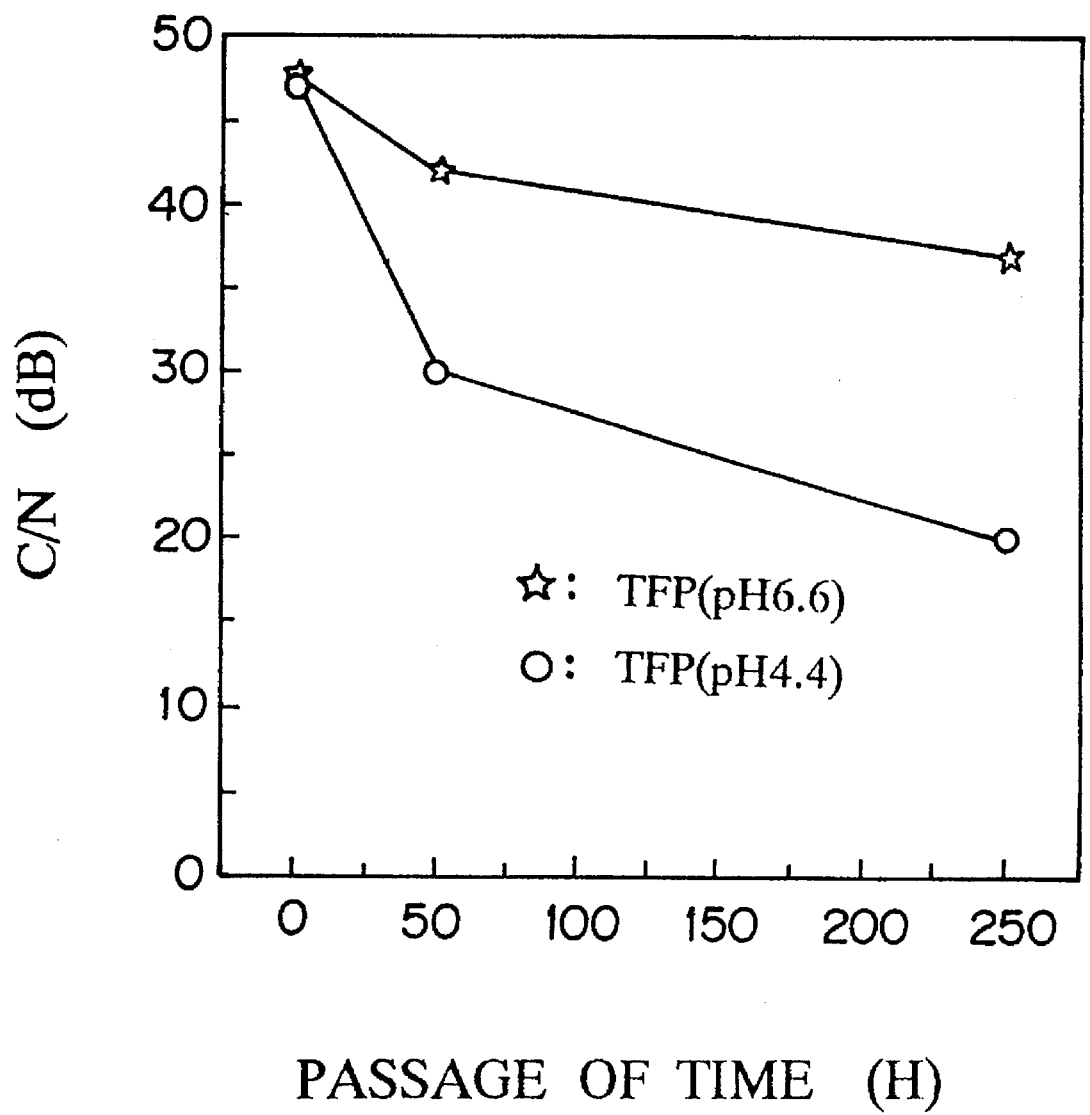
FIG. 5 is a graph showing a relationship between a C/N (Carrier to Noise) ratio and a passed time in the Example 1.

FIG. 1 is a partial enlarged sectional view illustrating one of the embodiment of a writable (WORM type) optical recording medium of the present invention which satisfies the standard of the CD.

As is shown in FIG. 1, an optical recording medium 1 of the present embodiment is provided with a light transmissive substrate 11 with grooves 10 formed thereon, a recording film 12 formed on the substrate 11, a reflective film 13 formed on the recording film 12 and a protection film 14 formed on the reflective film 13.

The light transmissive substrate 11 is formed in the shape of a disk. The grooves 10 for tracking are formed on one of the surface of the substrate 11, which grooves are in the shape of concentric circles or spiral. From the viewpoint of the improvement in productivity, a so-called injection-molding resin substrate, which is integrally formed, is preferably used as the light transmissive substrate 11. As the injection-molding material, for example, light transmissive resins, such as polycarbonate resin (PC) and poly methyl methacrylate (PMMA), are preferably used. The substrate formed by a so-called 2P (photo-polymer) method can be used in addition to the integrally formed injection-molding resin substrate. The thickness of the light transmissive substrate 11 is about 1.0 to 1.5 mm.

The recording film 12 is formed on the substrate 11. An organic dye is contained in the recording film 12. As the organic dye, there are phthalocyanine dye and cyanine dye. The preferable organic dye in those is the phthalocyanine dye expressed by the following formula [I]:

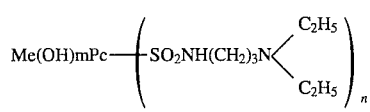

(I)

In the above formula [I], Me represents one of a Si atom, Al atom and Ga atom, Pc represents a phthalocyanine ring, m denotes an integer of 1 or 2, and n denotes an integer of 1 to 5.

The recording film 12 containing the above dye is formed on the light transmissive substrate 11 by conventional means, such as a spinner coating method. As the solvent used to form the organic dye, 2,2,3,3,-tetrafluoro-1-propanol (TFP) having pH of not less than 6.0, preferably not less than 6.4 is used. It is required that the above-mentioned 2,2,3,3,-tetrafluoro-1-propanol (TFP) does not show a light absorption property when a laser beam with a wave length within a range of 200 to 250 nm is irradiated thereon.

With the 2,2,3,3,-tetrafluoro-1-propanol (TFP) having pH of less than 6.0, the optical recording medium having the recording film, which uses the above-mentioned solvent to form thereof, has a high deterioration appearances caused by humidity, thus unable to stably function at high efficiency.

The thickness of the recording film 12 is within a range of 100 to 10000 Å, and preferably 500 to 5000 Å.

The reflective film 13 is formed on the recording film 12. As the material of the reflective film 13, there are metals, for example, such as gold (Au), silver (Ag), copper (Cu) and aluminum (Al). The reflective film 13 is formed by, for example, a vacuum deposition method, a sputtering method, an ion plating method and the like as a film formation method. The thickness of the reflective film 13 is about 0.2 to 2.0 μm.

On the reflective film 13, the protection film 14 is formed to protect the recording film 12 and the reflective film 13. The protection film 14 is formed by spinner-coating ultra-violet-ray hardening resin and then irradiating an ultraviolet ray, so as to harden the resin. Epoxy resin, acrylics resin, silicon resin, urethane resin and the like may be used for the material of the protection film 14.

The thickness of the protection film 14 is not less than 2.5 μm, and preferably not less than 3.0 μm. When the ultraviolet-ray hardening resin is used to form the protection film 14 and the thickness of the protection film 14 is excessively large, the hardening of the resin by irradiating an ultraviolet ray thereto cannot not be effectively performed. Accordingly, the thickness of the protection film 14 is preferably not more than 50 μm so as to effectively perform the hardening of the resin by irradiating an ultraviolet ray.

On the other side of the substrate on which the recording film 12 is not formed, a top coating film comprising an organic material can be formed to adjust a reflecting ratio. In addition, an intermediate layer may be formed between the substrate 11 and the recording film 12 to protect the substrate from the solvent.

Onto the recording film of the optical recording medium of the present invention thus made, a pulse-type recording laser beam is irradiated while the optical recording medium rotates at its center. With the above irradiation, a part of the recording film is melted and sublimed to form pits thereon.

The difference of the reflective amounts of the laser beam for reading, which is caused by the thus formed pits, is detected to reproduce while the optical recording medium rotates at its center.

Now, examples of experiment according to the present invention will be described in detail hereinbelow.

Example-1 of the experiment

The phthalocyanine dye defined by the following formula was dissolved in 2,2,3,3,-tetrafluoro-1-propanol (TFP) having pH of 6.6 to prepare a coloring matter coating liquid:

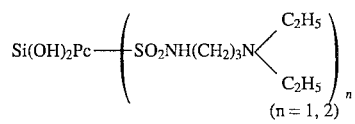

where, Pc represents a phthalocyanine ring.

Then, thus prepared coloring matter coating liquid was coated by means of the spinner-coating method on the surface of the polycarbonate resin substrate having a thickness of 1.2 mm and a diameter of 120 mm to form the recording film 12 having a thickness of 1000 Å.

On the thus formed recording film 12, the reflective film 13 having a thickness of 1000 Å was formed by means of the resistance-heating-type vacuum deposition method. Then, on the thus formed reflective film 13, the protection film comprising an ultraviolet-ray hardening type acrylate resin and having a thickness of 3 μm was further formed to prepare the optical recording medium of the present invention (the sample 1 of the invention).

On the other hand, another optical recording medium (the sample 2 for comparison) was prepared by the same process in the sample 1 of the invention except that 2,2,3,3,-tetrafluoro-1-propanol (TFP) having pH of 4.4 was used in place of 2,2,3,3,-tetrafluoro-1-propanol (TFP) having pH of 6.6.

The thus prepared sample 1 of the invention and sample 2 for comparison were subjected to the accelerated test under 45° C.-90% RH (Relative Humidity), and each item of Rtop signal, RFamp signal, Carrier level and C/N ratio was evaluated in relation to the deterioration of the single frequency of 108 ns caused by the difference in pH of the TFP.

The results are shown in FIGS. 2 to 5.

Example-2 of the experiment

Each of the 2,2,3,3,-tetrafluoro-1-propanol (TFP) having pH of 6.6 and 2,2,3,3,-tetrafluoro-1-propanol (TFP) having pH of 4.4 was diluted 36 times with water ($H_2O$), and investigated as for the spectral characteristics under the following conditions:

scanning speed: 300(750) nm/min, slit (visible): 2.00 nm, slit (near-infrared): automatic control, voltage of photo multiplier: automatic control, PbS sensitivity: 2.

Figure 6:
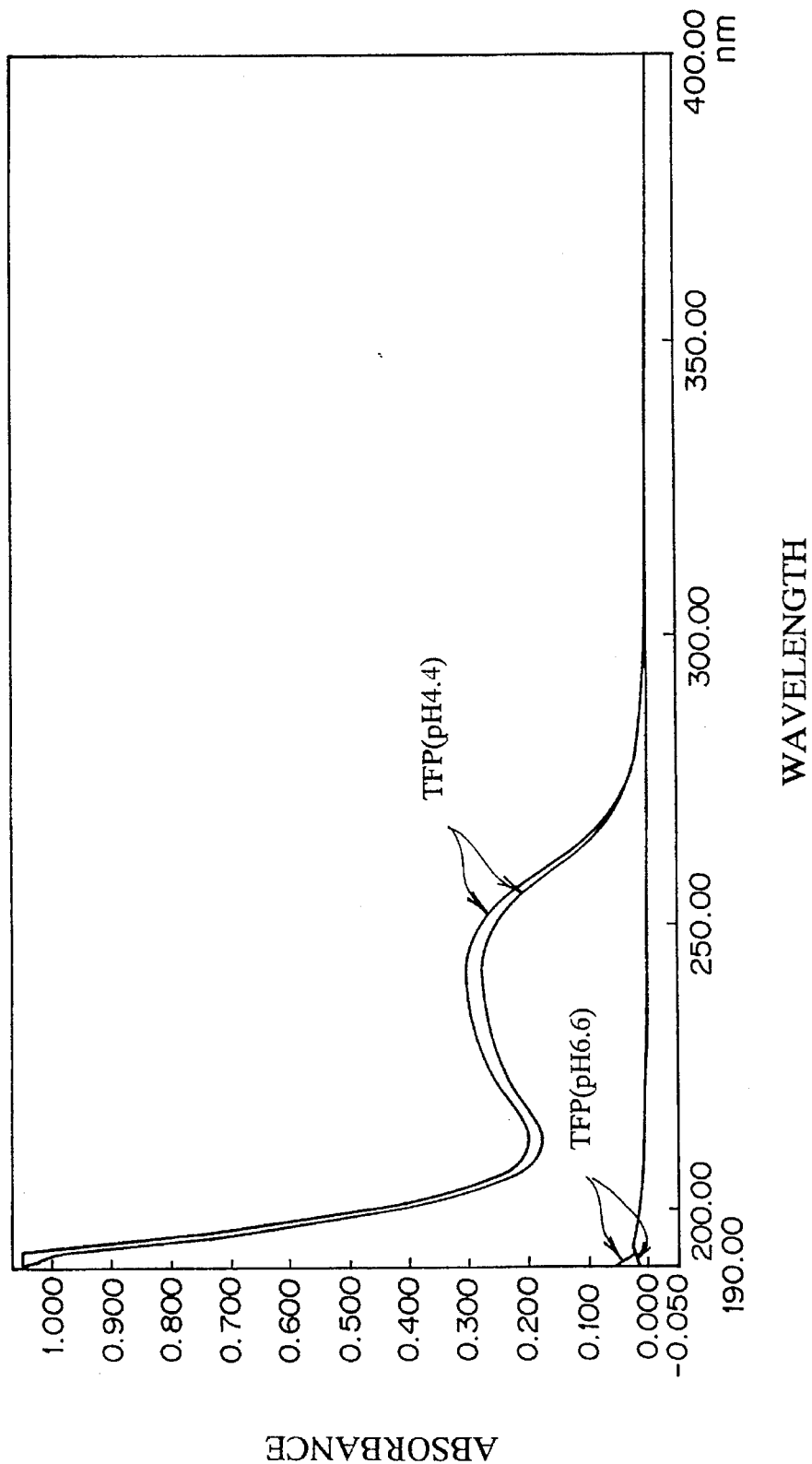
FIG. 6 is a figure showing a spectral characteristic for 2,2,3,3-tetrafluoro-1-propanol (TFP) with pH 4.4 and TFP with pH 6.6.

The results are shown in FIG. 6.

As is clear from FIGS. 2 to 5, the sample 1 of the invention shows less deterioration in each items of the evaluation than the sample 2 for comparison shows.

In addition, as is clear from FIG. 6, the sample 2 for comparison shows an optical absorption when a laser beam with a wave length within a range of 200 to 250 nm is irradiated thereon, thus the spectral characteristics thereof is unstable. Contrary to the above, the sample 1 of the invention shows no optical absorption when a laser beam with a wave length within a range of 200 to 250 nm is irradiated thereon, thus the spectral characteristics thereof is stable.

As is clear from the foregoing, it is confirmed that the optical recording medium of the present invention using the 2,2,3,3,-tetrafluoro-1-propanol (TFP) having pH of 6.6 as the solvent of the organic dye is excellent in the humidity resistance, i.e., less deterioration in quality due to humidity.

As described above in detail, according to the present invention, it is possible to provide the optical recording medium which stably function at high efficiency without deterioration in quality due to humidity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical recording medium comprising:

a light transmissive substrate;

a recording film formed of an organic dye by use of 2,2,3,3-tetrafluoro-1-propanol having pH of not less than 6.0 as a solvent, on a surface of said substrate;

a reflective film formed on a surface of said recording film; and a protection film formed on a surface of said reflective film.

2. An optical recording medium according to claim 1, wherein:

said 2,2,3,3-tetrafluoro-1-propanol has pH of not less than 6.4.

3. An optical recording medium according to claim 1, wherein:

said organic dye comprises a phthalocyanine dye expressed by the following formula (I):

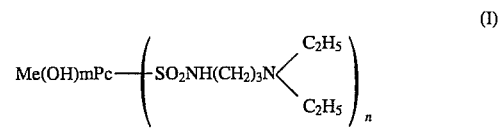

where, in said formula (I), Me represents one of a Si atom, Al atom and Ga atom, Pc represents a phthalocyanine ring, m denotes an integer of 1 or 2, and n denotes an integer of 1 to 5.

4. An optical recording medium according to claim 3, wherein:

said organic dye comprises a phthalocyanine dye expressed by the following formula (II):

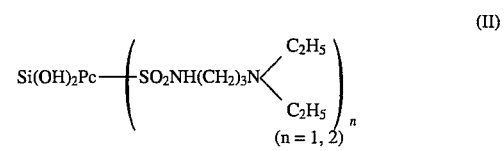

where, in said formula (II), Pc represents a phthalocyanine ring.

5. An optical recording medium according to claim 1, wherein:

said substrate has a thickness of from 1.0 to 1.5 mm, said recording film has a thickness of from 500 to 5000 Å, said reflective film has a thickness of from 0.02 to 2.0 μm and said protection film has a thickness of at least 2.5 μm.

* * * * *